(12) United States Patent
Zhang et al.

(10) Patent No.: US 12,373,457 B2
(45) Date of Patent: Jul. 29, 2025

(54) DATA CONVERSION WITH AUTOMATIC TYPE AND LOSS DETECTION

(71) Applicant: Formagrid Inc, San Francisco, CA (US)

(72) Inventors: Steven Zhang, Mercer Island, WA (US); Ling Long, San Francisco, CA (US); Elaine Zhou, San Francisco, CA (US); Bryan Jadot, San Francisco, CA (US); Matthew Brown, San Francisco, CA (US); Yana Gevorgyan, Mercer Island, WA (US); Linjie Ding, New York, NY (US)

(73) Assignee: Formagrid Inc, San Francisco, CA (US)

( * ) Notice: Subject to any disclaimer, the term of this patent is extended or adjusted under 35 U.S.C. 154(b) by 0 days.

(21) Appl. No.: 18/201,914

(22) Filed: May 25, 2023

(65) Prior Publication Data

US 2023/0385302 A1    Nov. 30, 2023

Related U.S. Application Data

(60) Provisional application No. 63/346,223, filed on May 26, 2022.

(51) Int. Cl.
*G06F 16/25* (2019.01)
*G06F 16/215* (2019.01)

(52) U.S. Cl.
CPC .......... *G06F 16/258* (2019.01); *G06F 16/215* (2019.01); *G06F 16/254* (2019.01)

(58) Field of Classification Search
CPC ..... G06F 16/258; G06F 16/215; G06F 16/254
See application file for complete search history.

(56) References Cited

U.S. PATENT DOCUMENTS

| | | | |
|---|---|---|---|
| 10,318,516 B1* | 6/2019 | Taylor | G06F 16/285 |
| 2005/0216432 A1* | 9/2005 | Harris | G06F 16/258 |
| 2006/0190497 A1 | 8/2006 | Inturi et al. | |
| 2009/0150396 A1* | 6/2009 | Elisha | G06F 16/24565 |
| 2010/0094882 A1* | 4/2010 | Lee | G06F 16/2471 707/755 |
| 2010/0094892 A1 | 4/2010 | Bent et al. | |

(Continued)

OTHER PUBLICATIONS

PCT International Search Report and Written Opinion, PCT Application No. PCT/IB2023/055396, Oct. 6, 2023, 11 pages.

*Primary Examiner* — Charles D Adams
(74) *Attorney, Agent, or Firm* — Fenwick & West LLP (57) ABSTRACT

A method for automatically detecting the data type of data in a column includes receiving a request to import data into a base and determining the data type of the column by applying a set of inferrers to the column. In response to an inferrer returning true, the method selects the data type corresponding to the inferrer as the data type of the column and casts the data in the column to the selected type. A method for importing, converting, and presenting data based on data loss metrics includes receiving a request to import data into a database and determining data loss metrics for each of a set of data types. A user interface is configured to display some of the data types in conjunction with data loss metrics. The method further includes receiving a selection of one of the data types and casting the data to the selected type.

12 Claims, 8 Drawing Sheets

(56) References Cited

U.S. PATENT DOCUMENTS

| | | | |
|---|---|---|---|
| 2011/0197119 A1* | 8/2011 | Ye | G06Q 30/08 715/226 |
| 2017/0090893 A1* | 3/2017 | Aditya | G06F 8/51 |
| 2017/0357487 A1 | 12/2017 | Balasubramanian et al. | |
| 2021/0365461 A1 | 11/2021 | Allahverdiyev et al. | |
| 2022/0083565 A1 | 3/2022 | Sethi et al. | |
| 2022/0300650 A1* | 9/2022 | Ekambaram | G06F 16/2465 |

* cited by examiner

DATA CONVERSION WITH AUTOMATIC TYPE AND LOSS DETECTION

CROSS REFERENCE TO RELATED APPLICATIONS

This application claims the benefit of U.S. Provisional Application No. 63/346,223, filed May 26, 2022, which is incorporated by reference in its entirety.

BACKGROUND

1. Technical Field

The subject matter described relates generally to databases and, in particular, to techniques for importing and converting data.

2. Background Information

Database systems often enforce structured data types upon data within a column. As such, importing data into the column may result in data loss, as not all the data may conform to the data type that the import is casted to. To reduce data loss, improve efficiency, and provide an enhanced user experience, improved ways to display useful information and navigate selections for the import of data are desirable.

SUMMARY

The above and other problems may be addressed by a first method for automatically detecting the data type of data in a column as well as a second method for importing, converting, and presenting data based on data loss metrics. The first method includes receiving a request to import data into a database and determining the data type of a column of the data by applying a set of inferrers to the column of data. An inferrer is a function containing rules to identify one data type. In response to an inferrer returning true, the first method selects the data type corresponding to the inferrer as the data type of the column of data and casts the data in the column to the selected data type.

A second method includes receiving a request to import data into a base and determining data loss metrics. The data loss metrics indicate a degree of data loss resulting from casting imported data to the corresponding data type. A data loss metric is determined for each of the possible data types. A user interface is configured to display some of the possible data types in conjunction with corresponding indicators of degree of data loss. The second method further includes receiving a selection of one of the possible data types and casting the imported data to the selected type.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements unless the context indicates otherwise.

Example Systems

Figure 1:
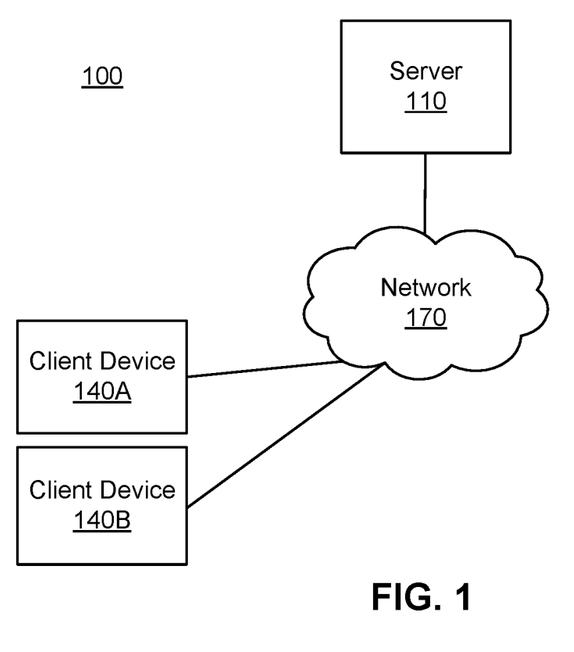
FIG. 1 is a block diagram of a networked computing environment suitable for data conversion with automatic type and loss detection, and for generating a dynamically updated preview of a data import.

FIG. 1 is a block diagram of a networked computing environment suitable for data conversion with automatic type and loss detection, and for generating a dynamically updated preview of a data import. In the embodiment shown, the networked computing environment 100 includes a server 110, a first client device 140A, and a second client device 140B, all connected via a network 170. Although two client devices 140 are shown, the networked computing environment 100 can include any number of client devices. In other embodiments, the networked computing environment 100 includes different or additional elements. In addition, the functions may be distributed among the elements in a different manner than described.

The server 110 hosts and manages multiple databases. The server 110 may facilitate various database functions, including the importing of data into databases, for example importing data from an external database system. The server 110 may provide a user interface to aid a user during data import. The server 110 may automatically detect the type of data included in a column of data. The user interface may include automatically generated indications of a degree of data loss that will result from importing data into columns of various types, which may be used to aid in selection of data types for columns. The server 110 may also provide a dynamic preview of the results of importing data with different column type selections to aid in the selection of column types. Various embodiments of the server 110 are described in greater detail below, with reference to FIG. 2.

The client devices 140 are computing devices with which users can access and edit the databases managed by the server 110. Example client devices include desktop computers, laptop computers, smartphone, tablets, etc. The client devices 140A and 140B may enable users to interact with the databases via a user interface accessed via a browser, a dedicated software application executing on the client devices, or any other suitable software.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
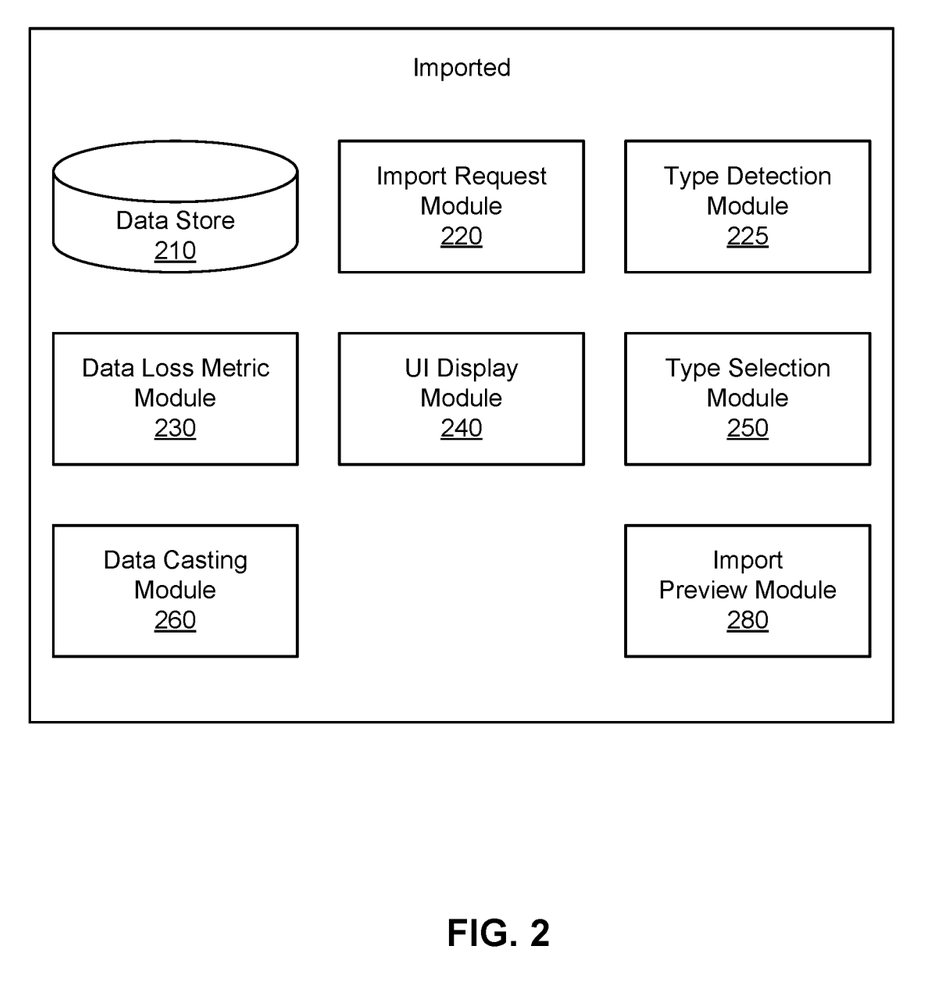
FIG. 2 is a block diagram of the server of FIG. 1, according to one embodiment.

FIG. 2 illustrates one embodiment of the server 110. In the embodiment shown, the server 110 includes a data store 210, import request module 220, type detection module 225, data loss metric module 230, UI display module 240, type selection module 250, data casting module 260, and import preview module 280. In other embodiments, the server 110 includes different or additional elements. In addition, the functions may be distributed among the elements in a different manner than described.

The data store 210 includes one or more computer-readable media that store the databases managed by the server 110. Although the data store 210 is shown as a single element within the server 110 for convenience, the data store 210 may be distributed across multiple computing devices (e.g., as a distributed database). Similarly, individual databases may be hosted by client devices 140 (or other computing devices) with the server 110 managing synchronization between databases but not storing the databases themselves. In embodiments, the data store 210 may store data requested for import and casting to a column of a base, data from previous imports into the base, data for other bases, user/account profile data, other data relevant for importing data and managing bases, or some combination thereof.

The import request module 220 receives, from a client device 140 operated by a user, a request to import data into a base. The data may be hosted by the client device 140 or may be hosted externally, such as on an external database system. "Data" may refer to a set of structured data. For example, data may be a table, a spreadsheet, or a JSON file. A "base" may refer to a collection of structured data (e.g., in table format) for which relations between the data can be derived. For example, the base may comprise tables stored in data store 210, and the relations between the tables may be derived using a common column. The data or the base may be structured as a two-dimensional matrix of cells, and as such have rows and columns. A cell refers to an individual unit of data and its metadata. A cell may have a type (e.g., number, text, Boolean, error), a value (e.g., a user-entered value or a computed result), a formula value (e.g., an expression), a formatted value (e.g., the value formatted to a string such as $1.23), a format (e.g., a number format such as a date (Nov. 12, 2013) or a text format such as background color, text color, typeface, font size, bold, italic, underline, strikethrough, etc.), a text format run (e.g., a section of text within the cell with a particular format), a hyperlink (e.g., a URL), or a pivot table anchored to the cell. In the case where the data is not structured as a two-dimensional matrix of cells, such as with a JSON file structured as a set of key, value pairs, the import request module 220 may format the data structure as a table or spreadsheet. For example, the import request module 220 may make the keys of a JSON file column names in a first row of a table and may make the values of the JSON file a second row of the table. The request may specify an import type, such as whether the data is in CSV, Google Sheets, Microsoft Excel, or a pasted data table format. The request may specify the base or part of the base (e.g., table) for the data to be imported into. In some embodiments, the request may specify a new base or a new part of a base as the destination for the data to be imported into.

Figure 7:
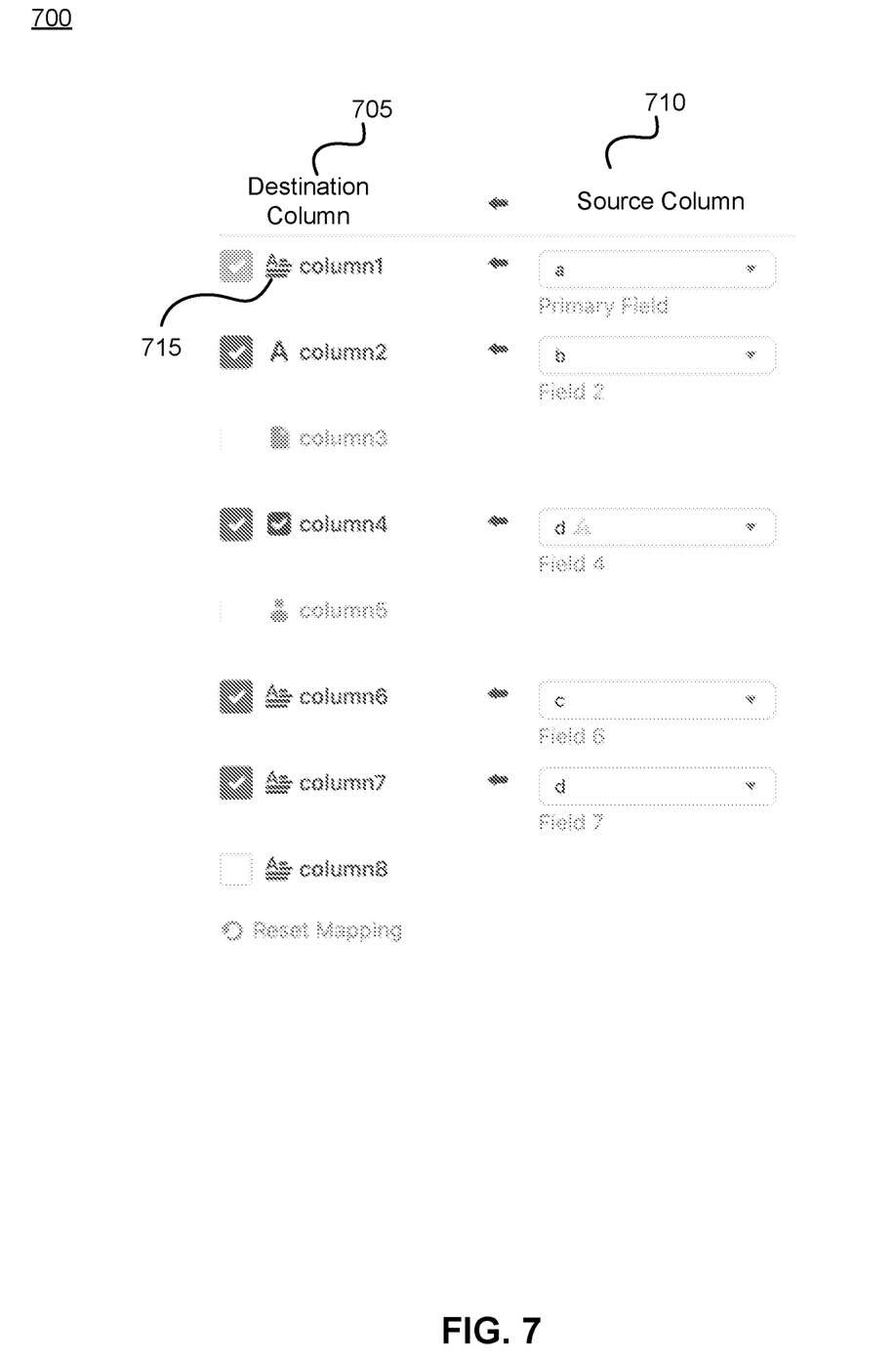
FIG. 7 is an example user interface for mapping columns of data to columns of a base.

The import request module 220 may map each column of data into a column of the base. In some embodiments, the import request module 220 may map each column of data into a column of the base automatically. For example, the import request module 220 may map the columns sequentially such that the first column of data maps to the first column of the base, the second column of data maps to the second column of the base, and so on. In some embodiments, the import request module 220 may receive, as part of the request, a mapping from the client device 140. A user interface for mapping columns of data to columns of the base is shown in FIG. 7.

The type detection module 225 determines a data type for a column of data mapped to a column of the base. Possible data types may include number, text, Boolean, or error types, or may be broken down into more granular categories, often called field types. For example, the number data type may include percentages, phone numbers, currencies, or numbers in scientific notation. The text data type may include emails, hyperlinks, single-line text, rich text, or long text. The Boolean data type may include true/false, yes/no, on/off, or checkboxes. The data type may be multi-select, for example if the data contains comma separated strings. The data type may be a date, for example Nov. 12, 2013 or November $12^{th}$.

The type detection module 225 may detect the data type of the column heuristically. In some embodiments, the type detection module 225 may detect the data type based on the first cell of the column of data, which often includes a header. For example, if the data in the first cell is "Date," then the cells in the column are likely of the date data type. In some embodiments, the type detection module 225 may detect the data type based on the value of neighboring cells in imported data, as cells that are adjacent to one another in an imported data table are likely to be of the same data type.

In some embodiments, the type detection module 225 may detect the data type of the column by scanning through each cell in the column and applying a set of inferrers, where an inferrer is a function containing rules to infer a data type. For example, the type detection module 225 may apply, to a cell in the column, a number inferrer. The number inferrer returns true if the data in the cell fits the rules of the number data type, thus inferring that the data is of the number data type. Inferrers include, but are not limited to, an empty inferrer, a date inferrer, a number inferrer, a multi-select inferrer, a checkbox inferrer, a rich text inferrer, and a long text inferrer. The empty inferrer returns true if all the cells in the column are empty. The date inferrer returns true if the cell contains numbers and if the numbers are in a pattern that matches a date pattern (e.g., ISO date, ISO date+24-hour time cycle) or a time pattern (e.g., 7:30 AM). The number inferrer returns true if the cell contains numbers and the numbers in the cell are not dates or times. The multi-select inferrer returns true if the data contains comma separated strings where the strings do not contain punctuation, new lines, or integers. The checkbox inferrer returns true if the data contains Booleans or particular values such as "checked" and "unchecked." The rich text inferrer returns true if the cells contain text and any of the cells have a text format run, where a text format run is a sequence of characters of the same format (e.g., font style, font family, font color, etc.). The long text inferrer returns true if the cells contain text and any of the cells have a newline character.

In some embodiments, the type detection module 225 may apply additional inferrers responsive to an inferrer returning true. For example, responsive to the number inferrer returning true, the type detection module 225 may apply a currency inferrer. The currency inferrer returns true if the data in the cell includes a currency symbol. In response to the currency inferrer returning true, the type detection module 225 may apply further inferrers to detect the specific type of currency. For example, the type detection module 225 may apply a U.S. Dollar currency inferrer, which returns true if the data in the cell contains the symbol for the U.S. Dollar ($).

In some embodiments, the type detection module 225 may apply the set of inferrers in a particular order, such as applying an empty inferrer to check if the cell is empty before applying a number inferrer to check if the cell contains data of the number data type. In this case, the type detection module 225 may not need to apply all inferrers in the set of inferrers. The type detection module 225 may instead apply the inferrers in order until one returns true (e.g., the type detection module 225 determines that the column is of the empty data type) or until a particular level of granularity is reached (e.g., the type detection module 225 determines that the data contains a specific type of currency). In some embodiments, responsive to no inferrer returning true, the type detection module 225 may detect that the column is of the single-line text data type.

In some embodiments, the type detection module 225 may apply the set of inferrers to a subset of the cells in the column. For example, the type detection module 225 may apply the set of inferrers to the first ten cells, the first 50% of cells, or may apply the set of inferrers to cells in the column until determining a threshold number or percentage of cells to be of the same data type. In some embodiments, the type detection module 225 may ignore the first cell in the column, as the first cell in the column may contain data of a different data type than the rest of the cells in the column (e.g., a header may be of the single-line text data type).

In some embodiments, the type detection module 225 may detect the data type by calculating a "likely fit score" for each data type and selecting the data type with the highest score. The type detection module 225 may generate the likely fit score with a scoring function, such as a machine learning (ML) based model trained to receive, as input, a column of data and to output a set of likely fit scores corresponding to different data types. Training data may include a set of data columns, labelled by data type. In some embodiments, the training data may be existing data that previous users have imported.

The data loss metric module 230 provides one or more mechanisms for determining a data loss metric. A data loss metric indicates a degree of data loss resulting from casting imported data to a data type. Data loss metrics are determined for each of a plurality of possible data types. For example, a data loss metric may be determined for a date data type, a number data type, a multi-select data type, a checkbox data type, a rich text data type, a long text data type, or other data types or field types that may be a relevant and useful category of data for a project. For a cell or column of data, the data loss metric module 230 may determine what percentage of the data may be lost if the data were forced into each of the available data types (e.g., zero, less than 50%, greater than 50%, 100%, etc.). In one embodiment, the data loss metric module 230 may use a machine learning model trained to receive, as input, a column of data and output a set of data loss metrics, each data loss metric in the set corresponding to a data type. Training data may include a set of data columns, labelled by data type. In some embodiments, the training data may be existing data that previous users have imported.

The UI display module 240 causes a user interface to display, for the column of data, at least some data types. Server 110 provides a user interface to the client device 140 of the user that is requesting the import of data into the base. The data types displayed may include the data type of the column automatically detected by the type detection module 225 or may include a set of available or possible data types, for example data types with a data loss metric less than a threshold data loss metric. In some embodiments, the UI display module 240 displays data types in conjunction with corresponding data loss metrics. For example, the user interface may provide the requesting user the ability to view the degree of data loss for each data type, including indicators of "no data loss," "complete data loss," or "partial data loss." The partial data loss indicator corresponds to an indication that the degree of data loss for casting the imported data to the corresponding data type is above a first threshold (e.g., above 50% data loss). The complete data loss indicator indicates that the degree of data loss for casting the imported data to the corresponding data type is at or above a second threshold (e.g., close to or at 100% data loss). The no data loss indicator may indicate that the degree of data loss for casting the imported data to the corresponding data type is at or below a third threshold (e.g., close to or at 0% data loss). In one embodiment, the indicators of degree of data loss further comprise an indicator that there is at least some data loss. For example, an indicator for "some data loss" or simply "data loss" may correspond to a degree of data loss above a fourth threshold (e.g., above 0% data loss).

Figure 6:
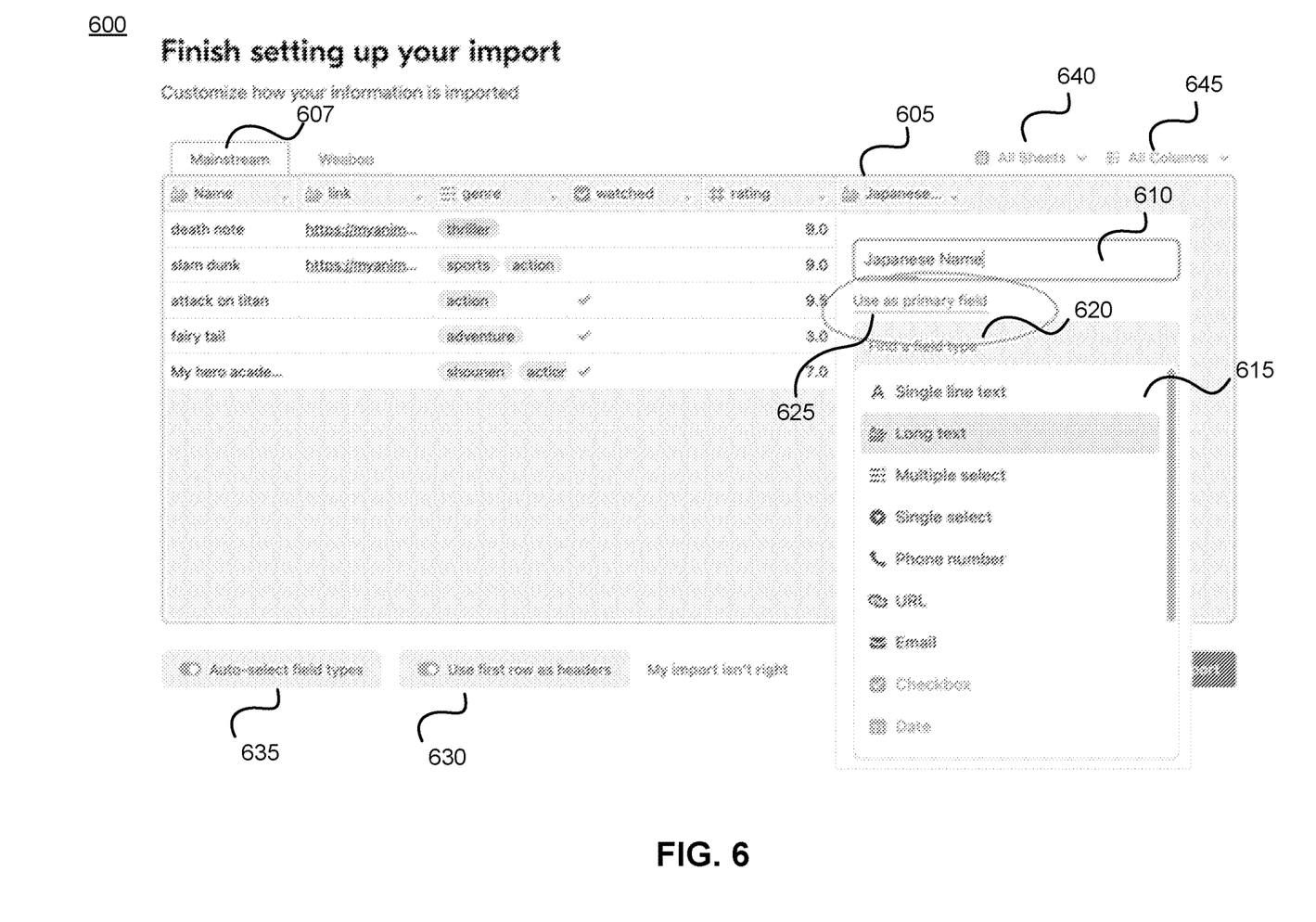
FIG. 6 is an example user interface illustrating a preview of data before it is imported into a base, according to one embodiment.

The user interface may be searchable and/or include a drop-down from which to select one of the available data types. In one embodiment, the ordering of the available data types in the drop-down menu may be based on the data loss metrics for each data type. For example, the data type with the lowest data loss metric may be listed first or higher in the drop-down menu relative to data types with higher data loss metrics. In one embodiment, the ordering of the available data types may be determined using a heuristic method that is based on the data loss metric for each data type in addition to other characteristics of the imported data. FIG. 6 shows an example user interface, including a drop-down menu containing data types available for casting data into a column.

The type selection module 250 selects a data type for the data in the column. In some embodiments, the type selection module 250 may select the data type automatically determined by the type detection module 225. In some embodiments, the type selection module 250 receives a selection of a data type from the user through client device 140. For example, the user may view the data types and corresponding data loss metrics in the user interface and choose the data type with the lowest data loss metric. Or the user may choose the data type determined by the type detection module 225.

The data casting module 260 casts the imported data to the selected data type. The data casting module 260 may repeat the casting process when importing additional columns data into other columns of the base.

Import preview module 280 generates a preview for a requested import. The preview is generated based on the import settings. When the import settings are modified, the preview can be updated to reflect the change in settings. In one embodiment, the preview is generated on the user's client device. The preview may be similar to the user interface shown in FIG. 6.

Example Methods

Figure 3:
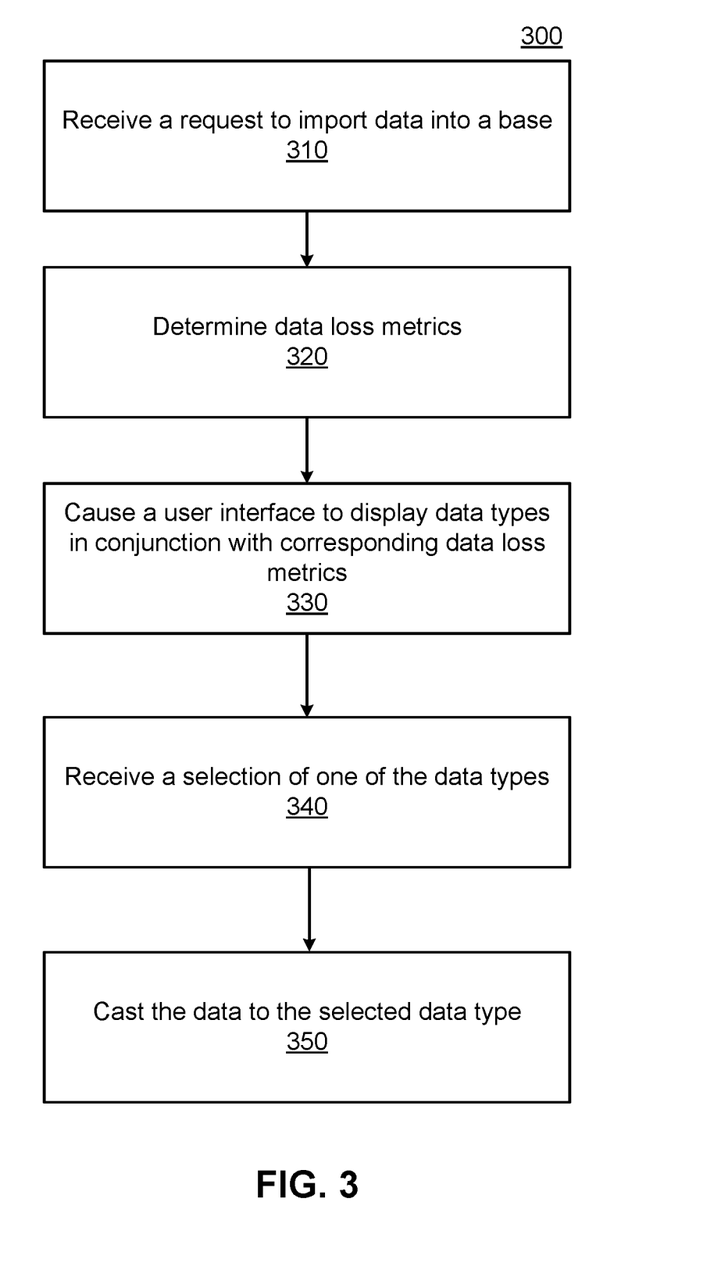
FIG. 3 is a flowchart of a method for data conversion with loss detection, according to one embodiment.

FIG. 3 illustrates a method 300 for data conversion with loss detection. The method 300 may be performed using server 110. Instructions for the method 300 may be stored as program code that is executable by one or more processors of server 110. For example, the method may be performed using the functionality and data of the components of server 110 shown in FIG. 2.

The server 110 receives 310, from a user of a client device 140, a request to import data into a base. The server 110 may store the data requested for import in a data store (e.g., data store 210). The server 110 may format the data such that it is structured as a two-dimensional matrix with rows and columns of cells.

The server 110 determines 320 data loss metrics for a column of the data. The data loss metrics may include, for each of a plurality of data types, a corresponding data loss metric indicating a degree of data loss resulting from casting the imported data to the data type. The server 110 may calculate or predict data loss metrics based on characteristics of the data requested for import. In one embodiment, the server 110 predicts data loss metrics using machine learning.

The server 110 causes 330 a user interface to display data types in conjunction with corresponding data loss metrics. In one embodiment, the server 110 recommends possible data types to a user in an order that is based on the data loss metrics (e.g., based on the degree of data loss). For example, the server 110 may recommend data types that are expected to result in little to no data loss (e.g., low data loss metric) first or at the top of a drop-down menu, while providing data types that are expected to result in greater data loss (e.g., higher data loss metrics) at the bottom of the drop-down menu or not at all. The server 110 may cause the user interface to display indicators of degree of data loss, including a "partial data loss indicator," a "complete data loss indicator," a "zero data loss indicator," or other indicators of a degree or presence of data loss.

The server 110 receives 340 a selection of one of the data types from the user of the client device 140. After the server 110 causes the user interface on the client device 140 to display the possible data types in conjunction with the degree of data loss for each data type, the user may navigate the user interface to select one of the possible data types. For example, the user may select the data type that results in the lowest degree of data loss when casting the imported data to the type. Upon the user making the selection, the client device 140 sends the user's selection to the server 110 for further processing.

The server casts 350 the data in the column to the selected data type. As such, the server 110 imports data into a column of the base and enforces the data type throughout the column.

In one embodiment, one or more of the steps 310, 320, 330, 340, and/or 350 may instead be performed by a client device (e.g., within a browser running on client device 140A or 140B). In such an embodiment, selections made by the user of the client device may be received by the client device and then submitted to the server 110 to complete the data import. Upon receiving the submitted data import, the server 110 may update data of data store 210 to synchronize the server 110 and the client device.

Figure 4:
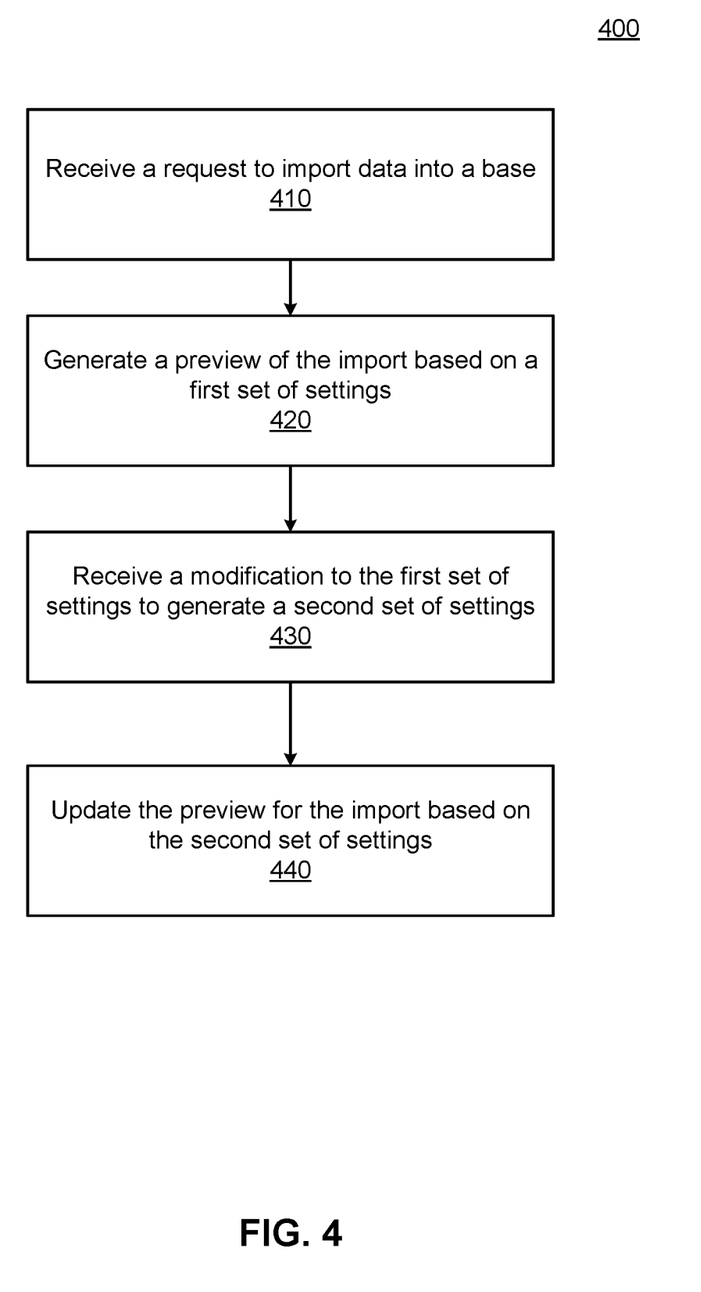
FIG. 4 is a flowchart of a method for generating a dynamically updated preview of a data import, according to one embodiment.

FIG. 4 illustrates a method 400 for generating a dynamically updated preview of a data import. The server 100 may perform the method 400. Instructions for the method 400 may be stored as program code that is executable by one or more processors of server 110. For example, the method may be performed using the functionality and data of the components of server 110 shown in FIG. 2.

The server 110 receives 410 a request to import data into a base. In one embodiment, the data may be stored in one or more CSV files. The user may use an interface provided on the client device 140 to select data for import into the base and to request the import. The request is sent from the client device 140 to the server 110.

The server 110 generates 420 a preview of the import based on a first set of settings. The settings may include mappings from the columns of data to columns in the base or the automatically selected data types of each column (e.g., selected by type selection module 250, determined by type detection module 225). The server 110 may generate the preview on the client device 140 and display the preview to the user through a user interface, such as the example user interface shown in FIG. 6.

The server 110 receives 430 a modification to the first set of settings to generate a second set of settings. For example, the user may modify the mappings from columns of data to columns in the base or may modify the data types for one or more of the columns. The server 110 may provide one or more user interfaces (e.g., user interfaces in FIG. 6 and FIG. 7) on the client device 140 through which the user may make the modifications.

The server 110 updates 440 the preview for the import based on the second set of settings. On receiving the modifications to the import settings and generating the second set of settings, the server 110 generates a new, updated preview for the import. The server 110 may send, for display, the updated preview to the client device 140 for presentation to the user in an interface.

In one embodiment, one or more of the steps 410, 420, 430, and/or 440 may be performed by the client device (e.g., within a browser running on client device 140A or 140B). In such an embodiment, selections made by the user of the client device 140 may be received by the client device 140 and then submitted to the server 110. Upon receiving the submitted user selections, the server 110 may update data of data store 210 to synchronize the server 110 and the client device.

Figure 5:
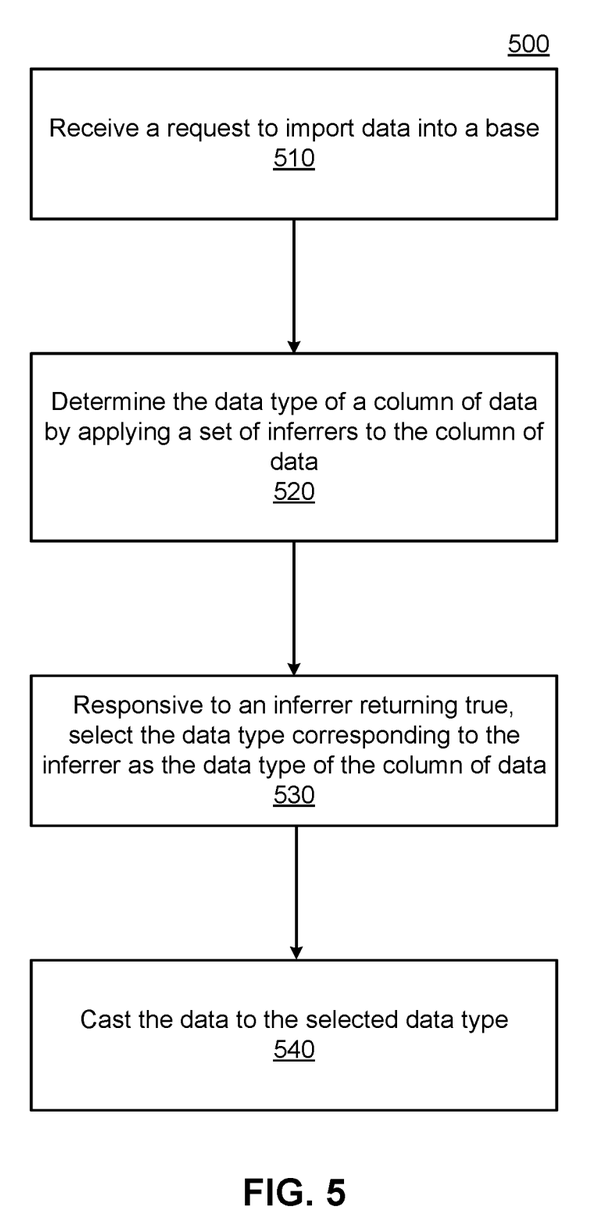
FIG. 5 is a flowchart of a method for automatically detecting a data type of a column of data, according to one embodiment.

FIG. 5 illustrates a method 500 for detecting a data type of a column of data. The server 110 may perform the method 500. Instructions for the method 500 may be stored as program code that is executable by one or more processors of server 110. For example, the method may be performed using the functionality and data of the components of server 110 shown in FIG. 2.

The server 110 receives 510, from a user of a client device 140, a request to import data into a base. The server 110 may store the data requested for import in a data store (e.g., data store 210). The server 110 may format the data such that it is structured as a two-dimensional matrix with rows and columns of cells.

The server 110 determines 520 the data type of a column of the data by applying a set of inferrers to the column of the data. For example, the inferrers may include an empty inferrer, a date inferrer, a number inferrer, a multi-select inferrer, a checkbox inferrer, a rich text inferrer, and a long text inferrer.

Responsive to an inferrer returning true, the server 110 selects 530 the data type corresponding to the inferrer as the data type of the column of data. The server 550 casts the data to the selected data type. As such, the server 110 imports data into a column of the base and enforces the data type throughout the column.

Example User Interfaces

FIG. 6 shows an example user interface 600. The user interface 600 shows a preview of data before it is imported into a base. The data is structured as a set of columns 605. In this example, the columns are "Name," "link," "genre," "watched," "rating," and "Japanese Name." The data includes multiple sheets 607 (e.g., tables). In this example, the sheets are "Mainstream" and "Weaboo." Responsive to the user selecting a column 605, for example the column titled "Japanese Name" of the "Mainstream" sheet, the user interface 600 may display a drop-down menu 610 containing data types 615 available for casting data (e.g., single-line text, long text, multi-select, etc.). In some embodiments, the user interface 600 may display an indicator of data loss for each data type 615 or may alter the appearance or function of the data type buttons. For example, the data types 615 "Checkbox" and "Date" are grayed out and shown at the bottom of the drop-down menu 610, indicating that those data types have higher data loss than the data types 615 shown in darker text above them.

The user interface 600 shows a search bar 620. A user may use the search bar to search for a data type or field type (e.g., if the user does not find the data type or field type listed in the dropdown menu). If a user uses the search bar 620 to search for a term that does not exist as a data type or field type, the user interface 600 may display a message indicating that no field types match the search or provide a button that, upon selection, clears the search.

Responsive to the user selecting a data type 615 from the dropdown menu 610, the user interface 600 may display a message. In some embodiments, if the user selects a data type 615 with data loss over a threshold data loss (e.g., 50%), the user interface 600 may display a warning icon or a message asking the user to confirm the selection or change the selection to a different data type. Responsive to casting the data to the selected data type, the user interface 600 may display a message confirming that the data type has changed (e.g., "type converted") and display a button allowing the user to undo the action. In some embodiments, if the data type of the column is changed to the data type it already is, the user interface will not confirm that the data type has changed or display the undo button.

The user interface 600 may also include a button 625 that, upon selection, makes the field a primary field. A primary field refers to the first column in the table, and in some embodiments cannot be deleted, moved, or hidden. The user interface 600 may display the previous primary field as the second column in the table. The user interface 600 may include a toggle button 630 to use the first row of the data as column headers and a toggle button 635 to auto-select field types (e.g., using the type detection module 225). The user interface 600 may include a sheet selection dropdown 640 and a column selection dropdown 645, allowing the user to select the columns or sheets of the data they would like to import. In some embodiments, the user interface 600 may only display the sheet selection dropdown 640 if the data includes more than one sheet.

FIG. 7 shows a user interface 700 for mapping columns of data to columns of a base. The server 110 may display the user interface 700 in response to a user requesting to import data or in response to a user selecting a button to map columns of data to columns of a base. The left side of user interface 700 shows destination columns 705, columns in the base. In this example, the destination columns 705 are "column1" through "column8." The right side of user interface 700 shows source columns 710, columns of the data being imported. In this example, the source columns 710 are "a" through "d." The rows in the user interface 700 each form a source to destination mapping, in which a column of data is mapped to a column in the base. For example, column "a" of data is mapped to "column1" in the base and column "b" of data is mapped to "column2" of the base. As seen in user interface 700, "column3" and "column5" of the base are grayed out, which may indicate that mapping data to those columns is unsupported (e.g., base column is full of data already, data type of the base column is incompatible with data type of the data columns). In some embodiments, a source column 710 may be imported into multiple destination columns 705. For example, column "d" of the data is mapped to both "column4" and "column1" of the base. Further, a user may un-check (unselect) a destination column 705 in the user interface 700, indicating that the destination column 705 will not, upon import, contain data from the source column 710. The user interface 700 may display icons 715 representing the data type of each column. For example, "column4" has a checkbox icon, indicating that the data is of the checkbox data type, while "column2" has a single-line text icon, indicating that the data is of the single-line text type.

Computing System Architecture

Figure 8:
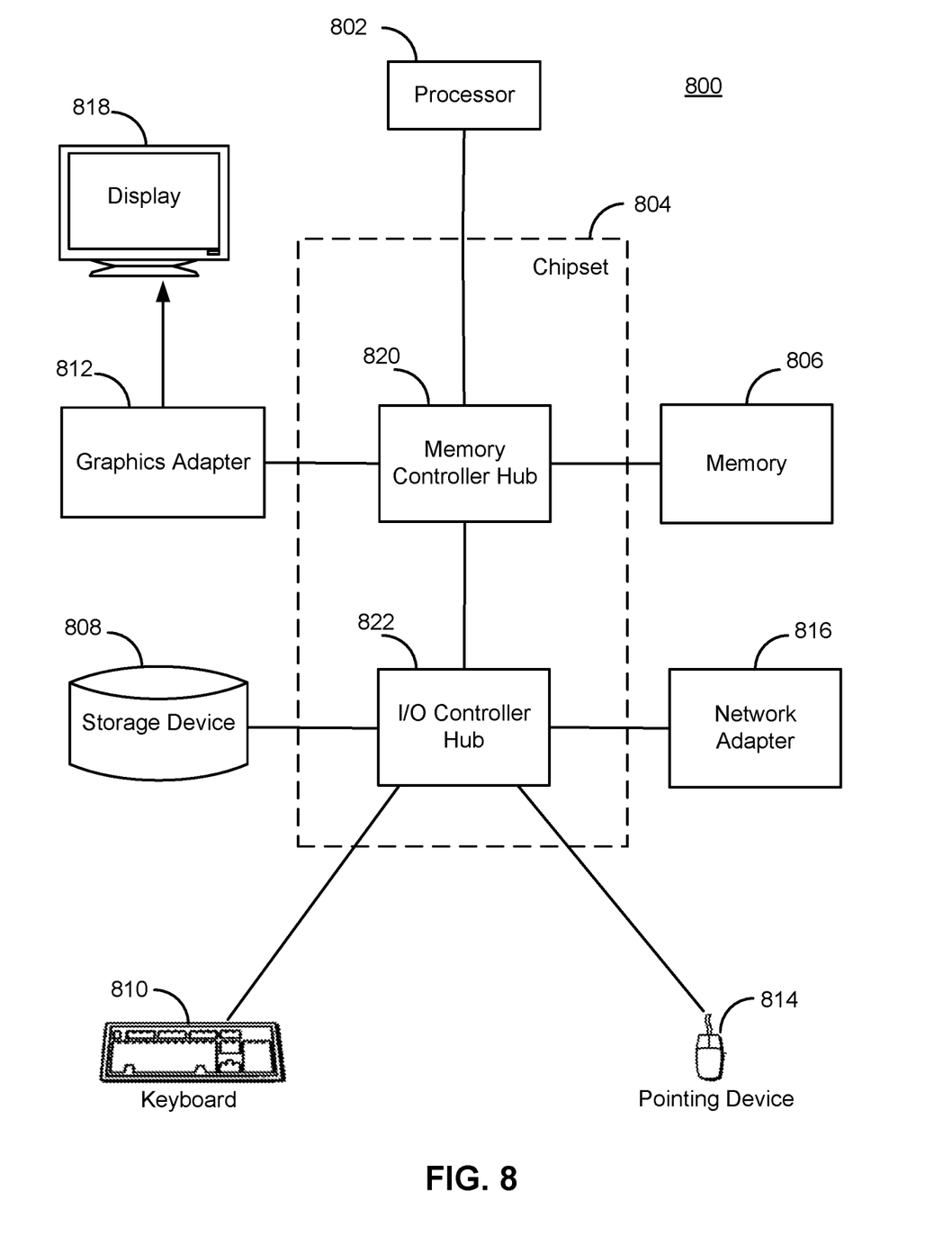
FIG. 8 is a block diagram illustrating an example of a computer suitable for use in the networked computing environment of FIG. 1, according to one embodiment.

FIG. 8 is a block diagram illustrating an example computer 800 suitable for use as the server 110 or a client device 140. The example computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, keyboard 810, pointing device 814, and network adapter 816 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a mouse, track ball, touchscreen, or other type of pointing device, and is used in combination with the keyboard 810 (which may be an on-screen keyboard) to input data into the computer system 800. The graphics adapter 812 displays images and other information on the display 818. The network adapter 816 couples the computer system 800 to one or more computer networks.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing partial synchronization of database tables. Thus, while particular embodiments and applications have been illustrated and described, it is to be understood that the described subject matter is not limited to the precise construction and components disclosed. The scope of protection should be limited only by the following claims.

The invention claimed is:

1. A method comprising:
receiving a request to import data into a base, wherein the data comprises one or more columns of data, each column of data including a plurality of values;
for a column of data, determining a data type to cast the column of data to, wherein determining the data type to cast the column of data to comprises:
for each of a plurality of candidate data types:
inputting, to a machine learning model, the column and the candidate data type, wherein the machine learning model is trained on previously imported columns of data, each previously imported column of data labeled with a corresponding data type; and
receiving, as output from the machine learning model, a likely fit score of the column to the candidate data type, the likely fit score indicative of a percentage of the plurality of values in the column of data that will be lost as a result of casting the plurality of values in the column of data to the candidate data type;
causing a user interface to display at least some of the candidate data types in conjunction with corresponding likely fit scores and data loss metrics, wherein the display of the at least some of the candidate data types includes display of a first data type of the plurality of candidate data types in conjunction with a corresponding first data loss metric and a second data type of the plurality of candidate data types in conjunction with a corresponding second data loss metric, the corresponding first data loss metric being a first indicator of a percentage of the plurality of values in the column of data that will be lost as a result of casting the column of data to the first data type and the corresponding second data loss metric being a second indicator of the percentage of the plurality of values in the column of data that will be lost as a result of casting the column of data to the second data type, and
receiving, from a user, a selection of one of the candidate data types; and
importing the data into the base, importing the data comprising casting the plurality of values in the column of data to the determined data type.

2. The method of claim 1, wherein causing a user interface to display at least some of the data types in conjunction with corresponding data loss metrics comprises causing the user interface to display data types in an order based on the corresponding data loss metrics.

3. The method of claim 1, wherein the first indicator of the percentage of the plurality of values in the column of data that will be lost comprises a partial data loss indicator for a percentage of data loss above a first threshold.

4. The method of claim 1, wherein the first indicator of the percentage of the plurality of values in the column of data that will be lost comprises a complete data loss indicator for a percentage of loss at or above a second threshold.

5. The method of claim 1, wherein the first indicator of the percentage of the plurality of values in the column of data that will be lost comprises a zero data loss indicator for a percentage of loss at or below a third threshold.

6. The method of claim 1, wherein the first indicator of the percentage of the plurality of values in the column of data that will be lost comprises an indicator for a percentage of loss above a fourth threshold.

7. A non-transitory computer-readable medium comprising stored instructions that, when executed, cause a computing device to perform operations including:
receiving a request to import data into a base, wherein the data comprises one or more columns of data, each column of data including a plurality of values;
for a column of data, determining a data type to cast the column of data to, wherein determining the data type to cast the column of data to comprises:
for each of a plurality of candidate data types:
inputting, to a machine learning model, the column and the candidate data type, wherein the machine learning model is trained on previously imported columns of data, each previously imported column of data labeled with a corresponding data type; and
receiving, as output from the machine learning model, a likely fit score of the column to the candidate data type, the likely fit score indicative of a percentage of the plurality of values in the column of data that will be lost as a result of casting the plurality of values in the column of data to the candidate data type;
causing a user interface to display at least some of the candidate data types in conjunction with corresponding likely fit scores and data loss metrics, wherein the display of the at least some of the candidate data types includes display of a first data type of the plurality of candidate data types in conjunction with a corresponding first data loss metric and a second data type of the plurality of candidate data types in conjunction with a corresponding second data loss metric, the corresponding first data loss metric being a first indicator of a percentage of the plurality of values in the column of data that will be lost as a result of casting the column of data to the first data type and the corresponding second data loss metric being a second indicator of the percentage of the plurality of values in the column of data that will be lost as a result of casting the column of data to the second data type, and receiving, from a user, a selection of one of the candidate data types; and importing the data into the base, importing the data comprising casting the plurality of values in the column of data to the determined data type.

8. The non-transitory computer-readable medium of claim 7, wherein causing a user interface to display at least some of the data types in conjunction with corresponding data loss metrics comprises causing the user interface to display data types in an order based on the corresponding data loss metrics.

9. The non-transitory computer-readable medium of claim 7, wherein the first indicator of the percentage of the plurality of values in the column of data that will be lost comprises a partial data loss indicator for a percentage of data loss above a first threshold.

10. The non-transitory computer-readable medium of claim 7, wherein the first indicator of the percentage of the plurality of values in the column of data that will be lost comprises a complete data loss indicator for a percentage of loss at or above a second threshold.

11. The non-transitory computer-readable medium of claim 7, wherein the first indicator of the percentage of the plurality of values in the column of data that will be lost comprises a zero data loss indicator for a percentage of loss at or below a third threshold.

12. The non-transitory computer-readable medium of claim 7, wherein the first indicator of the percentage of the plurality of values in the column of data that will be lost comprises an indicator for a percentage of loss above a fourth threshold.

* * * * *